US006459197B1

(12) United States Patent
Mori et al.

(10) Patent No.: US 6,459,197 B1
(45) Date of Patent: Oct. 1, 2002

(54) FLUORESCENT LAMP AND LUMINAIRE WITH IMPROVED ILLUMINATION LIGHT IN A LOW COLOR TEMPERATURE REGION

(75) Inventors: Toshio Mori, Osaka (JP); Hiromi Tanaka, Osaka (JP); Toru Higashi, Osaka (JP); Kenji Mukai, Osaka (JP); Tetsuji Takeuchi, Kyoto (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/405,471

(22) Filed: Sep. 24, 1999

(30) Foreign Application Priority Data

Sep. 29, 1998 (JP) .......................................... 10-274918

(51) Int. Cl.[7] .......................... H01J 63/04; C09K 11/08

(52) U.S. Cl. ................................ 313/487; 252/301.4 R

(58) Field of Search ................................ 313/487, 486, 313/485, 635; 252/301.4 R, 301.4 P, 301.6 F

(56) References Cited

U.S. PATENT DOCUMENTS

| | | | | |
|---|---|---|---|---|
| 3,064,123 A | | 11/1962 | Anderson et al. | 362/225 |
| 3,721,818 A | * | 3/1973 | Stahlhut | 240/106 R |
| 4,251,750 A | | 2/1981 | Gallien et al. | 313/487 |
| 5,714,836 A | | 2/1998 | Hunt et al. | 313/487 |
| 5,854,533 A | * | 12/1998 | Pappalardo | 313/487 |
| 6,157,126 A | * | 12/2000 | Yano et al. | 313/485 |

FOREIGN PATENT DOCUMENTS

| | | |
|---|---|---|
| CA | 2105021 | 3/1994 |
| EP | 0594 424 | 4/1994 |
| EP | 0 595 527 | 5/1994 |
| EP | 0 595 627 | 5/1994 |
| EP | 0 896 361 | 2/1999 |
| JP | 54-68084 | 5/1979 |
| JP | 10-214600 | 1/1997 |
| JP | 9-161724 | 6/1997 |
| JP | 10-334854 | 12/1998 |

OTHER PUBLICATIONS

K. Mahr "Colour rendition and luminous effeciency particularly of combinations of four or five narrow band emissions" Journal of Electrochemical Society 1972, pp 202–207.

Copy of the Notice of Opposition to a European Patent and its English translation.

* cited by examiner

*Primary Examiner*—Ashok Patel
*Assistant Examiner*—Thelma Sheree Clove
(74) *Attorney, Agent, or Firm*—Merchant & Gould P.C.

(57) ABSTRACT

A fluorescent lamp includes a phosphor layer containing a blue phosphor having an emission peak in the 440 to 470 nm wavelength range, a green phosphor having an emission peak in the 505 to 530 nm wavelength range, a green phosphor having an emission peak in the 540 to 570 nm wavelength range, and a red phosphor having an emission peak in the 600 to 670 nm wavelength range. The ratio $I_1/I_2$ of the emission peak energy $I_1$ in the wavelength range of 505 to 530 nm to the emission peak energy $I_2$ in the wavelength range of 540 to 570 nm is not less than 0.06. The color temperature of the lamp is not more than 3700 K.

13 Claims, 6 Drawing Sheets

FLUORESCENT LAMP AND LUMINAIRE WITH IMPROVED ILLUMINATION LIGHT IN A LOW COLOR TEMPERATURE REGION

BACKGROUND OF THE INVENTION

1. Field of the Invention

The present invention relates to a fluorescent lamp and a luminaire.

2. Description of the Prior Art

Recently, a tricolor fluorescent lamp having a phosphor layer comprising phosphors emitting blue, green and red is widely used for main illumination in houses and stores.

In this tricolor fluorescent lamp, highly efficient rare earth activated phosphors are commonly used. Examples of commonly used phosphors include a bivalent europium activated barium magnesium aluminate blue phosphor, a bivalent europium activated strontium chlorophosphate blue phosphor, a trivalent cerium and trivalent terbium activated lanthanum orthophosphate green phosphor, a trivalent europium activated yttrium oxide red phosphor or the like. The tricolor fluorescent lamp has a higher luminous flux and a higher color rendering than a fluorescent lamp using a calcium halophosphate phosphor $Ca_{10}(PO_4)_6FCl$: Sb, Mn, which emits white alone, as a phosphor layer, so that it is widely used in spite of its expensiveness.

The tricolor fluorescent lamp can create different light colors by changing the ratio of blending of blue, green and red phosphors used in the lamp. Fluorescent lamps for general illumination purposes can be classified roughly into lamps in a low color temperature region of not more than 3700 K, lamps in a medium color temperature region ranging from 3900 to 5400 K, and lamps in a high color temperature region of not less than 5700 K.

The correlated color temperature of the fluorescent lamp affects the atmosphere of an illuminated space to a large extent. For example, it is known that a lamp in a low color temperature region creates a relaxed and warm atmosphere, and a lamp in a high color temperature region creates a cool atmosphere.

Colors reproduced by a variety of light sources usually are quantified and compared based on the color rendering index (generally, general color rendering index). The color rendering index evaluates quantitatively how faithfully an illumination light reproduces colors, compared with a reference light. As the reference light, a blackbody radiation or CIE daylight illuminant having the same correlated color temperature as that of the illumination light is used.

At the present, the fluorescent lamps having a correlated color temperature of not less than 3900 K predominantly are used in houses and stores. However, recently, fluorescent lamps in a low color temperature region with a correlated color temperature of 3700 K or less are used increasingly, although gradually, in order to create a relaxed atmosphere in an illuminated space.

However, the light color of the lamp in a low color temperature region with a correlated color temperature of 3700 K or less is highly yellowish, and the color of an illuminated object is not so colorful, so that the object overall looks dull, even though the lamp is a tricolor fluorescent lamp having a high color rendering index. Thus, the color of the illuminated object looks less agreeable under illumination with a fluorescent lamp in a low temperature region, although the fluorescent lamp has an equal general color rendering index.

SUMMARY OF THE INVENTION

Therefore, with the foregoing in mind, it is an object of the present invention to provide a fluorescent lamp and a luminaire that can radiate illumination light having a correlated color temperature of 3700 K or less that allows the color of an illuminated object to look agreeable, even though the light color is in a low color temperature region, by making the color of the illuminated object more colorful.

In order to achieve the object, a fluorescent lamp of the present invention includes a phosphor layer containing a blue phosphor having an emission peak in the 440 to 470 nm wavelength range, a green phosphor having an emission peak in the 505 to 530 nm wavelength range, a green phosphor having an emission peak in the 540 to 570 nm wavelength range, and a red phosphor having an emission peak in the 600 to 670 nm wavelength range. The ratio $I_1/I_2$ of the emission peak energy $I_1$ in the wavelength range of 506 to 530 nm to the emission peak energy $I_2$ in the wavelength range of 540 to 570 nm is not less than 0.06, and the correlated color temperature of the lamp is not more than 3700 K.

This embodiment provides a fluorescent lamp in a low color temperature region in which the colorfulness of a color of an object perceived under illumination is improved.

In the fluorescent lamp, it is preferable that the ratio $I_1/I_2$ of the emission peak energy $I_1$, in the wavelength range of 505 to 530 nm to the emission peak energy $I_2$ in the wavelength range of 540 to 570 nm is in the range from 0.06 to 0.50. This preferable embodiment provides a fluorescent lamp in a low color temperature region in which the colorfulness of a color of an object perceived under illumination is improved and the color looks agreeable.

In the fluorescent lamp, it is preferable that the color point of the lamp is present in a region where the sign of the chromaticity deviation from the Planckian locus is minus in the CIE 1960 UCS diagram. This preferable embodiment provides a fluorescent lamp in a low color temperature region in which the colorfulness of a color of an object perceived under illumination is improved further.

In the fluorescent lamp, it is preferable that the color point of the lamp is present in a region where the chromaticity deviation from the Planckian locus is in the range from −0.007 to −0.003 in the CIE 1960 UCS diagram. This preferable embodiment provides a fluorescent lamp in a low color temperature region in which the colorfulness of a color of an object perceived under illumination is improved further and the color looks agreeable.

In the fluorescent lamp, it is preferable that the blue phosphor having an emission peak in the 440 to 470 nm wavelength range is a blue phosphor that is activated with bivalent europium.

In the fluorescent lamp, it is preferable that the green phosphor having an emission peak in the 505 to 530 nm wavelength range is a green phosphor that is activated with bivalent manganese.

In the fluorescent lamp, it is preferable that the green phosphor having an emission peak in the 540 to 570 nm wavelength range is a green phosphor that is activated with trivalent terbium.

In the fluorescent lamp, it is preferable that the red phosphor having an emission peak in the 600 to 670 nm wavelength range is a red phosphor that is activated with at least one selected from the group consisting of trivalent europium, bivalent manganese and tetravalent manganese.

In order to achieve the object, a luminaire of the present invention radiates illumination light including a combination of emission lights whose emission peaks in the 440 to 470 nm, 505 to 530 nm, 540 to 570 nm, and 600 to 670 nm wavelength ranges. The ratio $I_1/I_2$ of the emission peak energy $I_1$, in the wavelength range of 505 to 530 nm to the emission peak energy $I_2$ in the wavelength range of 540 to 570 nm is not less than 0.06, and the correlated color temperature of the illumination light is not more than 3700 K.

This embodiment provides a luminaire radiating illumination light in a low color temperature region in which the colorfulness of a color of an object perceived under illumination is improved.

The luminaire preferably includes a light source and at least one selected from the group consisting of a transmitting plate and a reflecting plate for converting light radiated from the light source to the illumination light.

In the luminaire, it is preferable that the ratio $I_1/I_2$ of the emission peak energy $I_1$, in the wavelength range of 505 to 530 nm to the emission peak energy $I_2$ in the wavelength range of 540 to 570 nm is in a range from 0.06 to 0.50. This preferable embodiment provides a luminaire radiating illumination light in a low color temperature region in which the colorfulness of a color of an object perceived under illumination is improved and the color looks agreeable.

In the luminaire, it is preferable that the color point of the illumination light is present in a region where the sign of the chromaticity deviation from the Planckian locus is minus in the CIE 1960 UCS diagram. This preferable embodiment provides a luminaire radiating illumination light in a low color temperature region in which the colorfulness of a color of an object perceived under illumination is improved further.

In the luminaire, it is preferable that the color point of the illumination light is present in a region where the chromaticity deviation from the Planckian locus is in a range from −0.007 to −0.003 in the CIE 1960 UCS diagram. This preferable embodiment provides a luminaire radiating illumination light in a low color temperature region in which the colorfulness of a color of an object perceived under illumination is improved further and the color looks agreeable.

Thus, the present invention provides a fluorescent lamp and a luminaire that radiate illumination light having a correlated color temperature of 3700 K or less that allows colors of illuminated objects to look more agreeable by improving the colorfulness of the colors perceived under illumination.

These and other advantages of the present invention will become apparent to those skilled in the art upon reading and understanding the following detailed description with reference to the accompanying figures.

DESCRIPTION OF THE PREFERRED EMBODIMENTS

A fluorescent lamp of the present invention includes a phosphor layer containing a blue phosphor having an emission peak in the 440 to 470 nm wavelength range, a green phosphor having an emission peak in the 505 to 530 nm wavelength range, a green phosphor having an emission peak in the 540 to 570 nm wavelength range, and a red phosphor having an emission peak in the 600 to 670 nm wavelength range. Furthermore, the fluorescent lamp allows the color of an illuminated object to look colorful, although the color temperature of the lamp is in a low color temperature region of 3700 K or less, preferably 3500 K or less.

Figure 1:
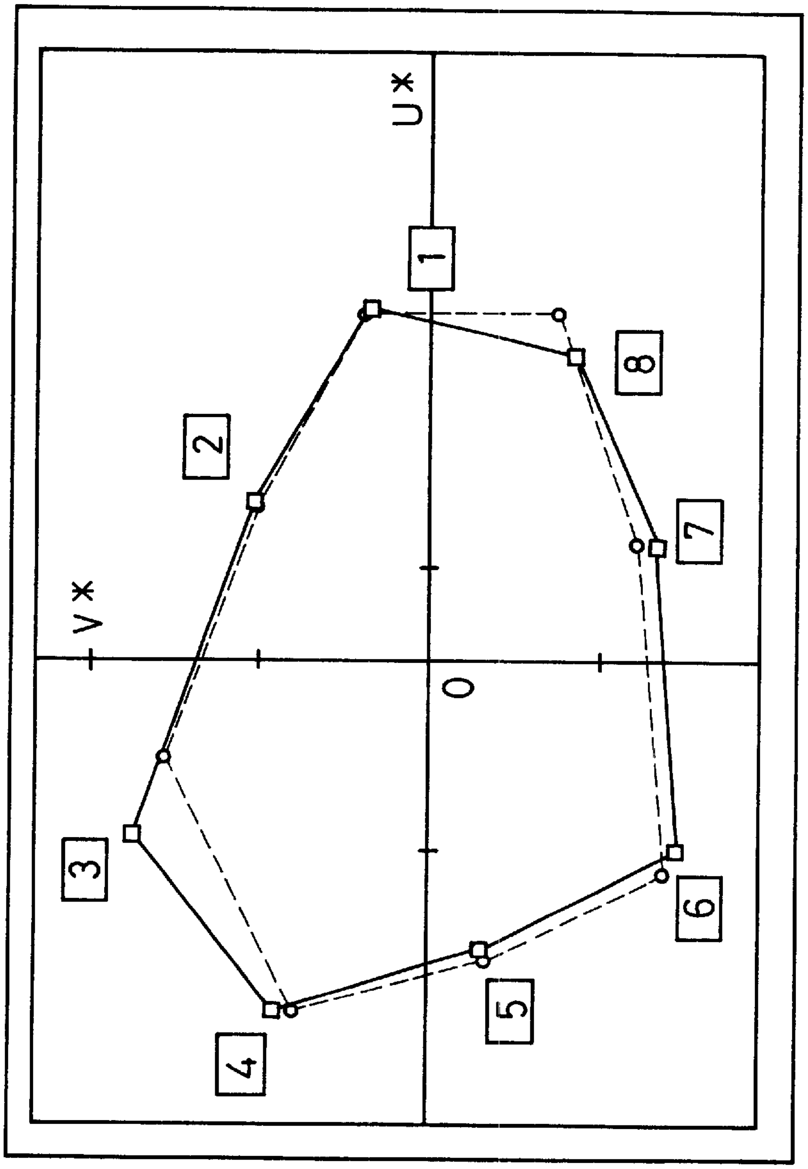
FIG. 1 is a diagram showing a CIE 1964 uniform color space for explaining a color gamut area Ga.

The colorfulness of a color of an object perceived under illumination can be quantified by a color gamut area on CIE 1964 uniform color space normalized to reference illuminant (hereinafter, referred to as "color gamut area Ga"). A method for calculating the color gamut area Ga will be described with reference to FIG. 1. With respect to test colors Nos. 1 to 8 used in the calculation of a general color rendering index Ra, color points of colors reproduced under illumination with a sample light source (fluorescent lamp) are plotted in a CIE 1964 uniform color space, and the eight color points are connected by straight lines to form an octagon (shown by the solid line in FIG. 1). Then, the area thereof ($S_1$) is calculated. Similarly, an octagon (shown by the dashed line in FIG. 1) with respect to a reference light source is formed in the CIE 1964 uniform color space, and the area thereof ($S_2$) is calculated. A color gamut area Ga is calculated based on the areas $S_1$ and $S_2$ according to the following formula:

$$Ga = S_1/S_2 \times 100.$$

The reference light is a blackbody radiation or CIE daylight illuminant having the same correlated color temperature as that of the sample light source. The test colors Nos. 1 to 8 are color samples with various hues, which have mean Munsell chroma and a Munsell value of 6.

The color gamut area Ga is used as an index indicating colorfulness of various colors on the average. Ga of 100 or more indicates that the chromaticness is larger on the average than that of the reference source, namely, the colorfulness is larger.

The fluorescent lamp of the present invention has a color gamut area Ga of 102.5 or more, preferably 102.5 to 120.0. When Ga is less than 102.5, the colorfulness of colors perceived under illumination is not improved sufficiently. When Ga exceeds 120.0, the colors of some illuminated objects look so colorful as to look unnatural.

In the fluorescent lamp of the present invention, the colorfulness of a color of an object perceived under illumination is correlated with the ratio $I_1/I_2$ of the emission peak energy $I_1$, in the wavelength range of 505 to 530 nm to the emission peak energy $I_2$ in the wavelength range of 540 to 570 nm. In other words, as $I_1/I_2$ becomes larger, the colorfulness of a color of an object perceived under illumination tends to be larger.

In the fluorescent lamp of the present invention, $I_1/I_2$ is set at 0.06 or more. When $I_1/I_2$ is less than 0.06, the colorfulness of a color of an object perceived under illumination is not improved sufficiently. When $I_1/I_2$ is too large, the luminous flux may drop because the proportion of the emission in the wavelength range of 540 to 570 nm, which is advantageous in terms of the luminous flux, decreases. When the luminous flux drops, the illuminance drops. Therefore, even if the color of an object look more colorful, the color does not necessarily look better. Therefore, it is preferable that $I_1/I_2$ is not more than 0.50. More preferably, $I_1/I_2$ is 0.1 to 0.35.

Figure 2:
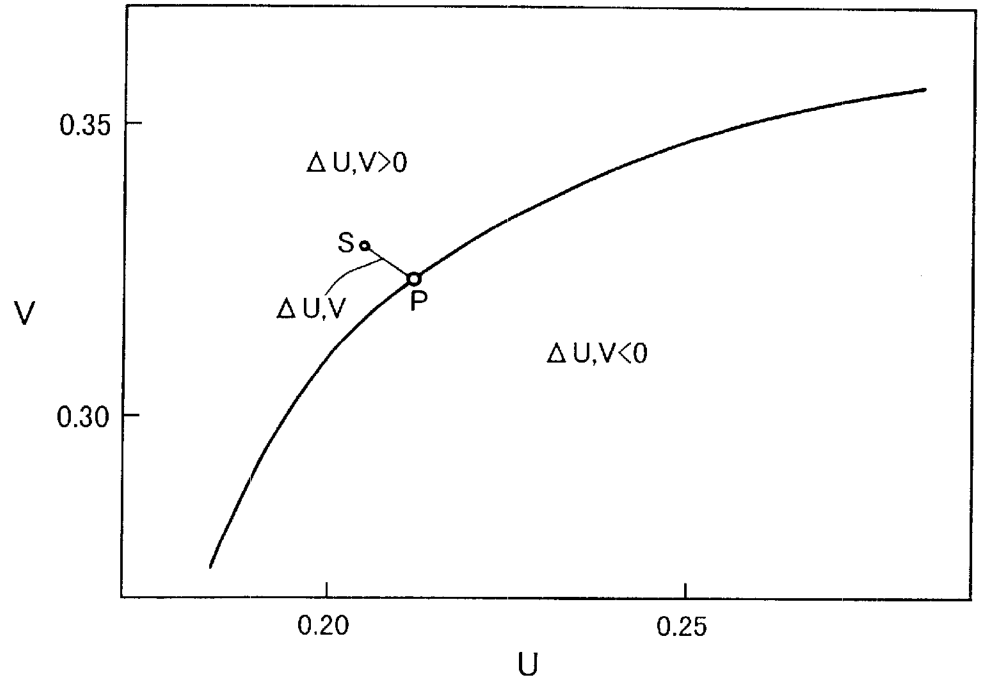
FIG. 2 is a CIE 1960 UCS diagram for explaining a chromaticity deviation.

Furthermore, the colorfulness of a color of an object perceived under illumination is correlated with a distance of how far the color point of the illumination color is away from the Planckian locus. The distance between the color point and the Planckian locus can be represented by the chromaticity deviation from the Planckian locus. The chromaticity deviation will be described with reference to FIG. 2. The chromaticity deviation from the Planckian locus is a distance (Δu, v) between the color point S and the Planckian locus in the CIE 1960 UCS diagram with a sign of − or + assigned. Regarding the sign of the chromaticity deviation, the sign + is assigned when the color point S is on the upper left side of the Planckian locus (i.e., u is smaller and v is larger than the point P on the Planckian locus that is the nearest to the color point S of the illumination light). The sign − is assigned when the color point S is on the lower right side of the Planckian locus (i.e., u is larger and v is smaller than the point P on the Planckian locus that is the nearest to the color point S of the illumination light).

In the fluorescent lamp of the present invention, in the case where the correlated color temperature is the same value, as the color point of the lamp is farther away from the Planckian locus on the lower right side in the CIE 1960 UCS diagram, namely, the chromaticity deviation from the Planckian locus becomes larger in the minus direction, the color gamut area Ga increases. In other words, the colorfulness of a color of an object perceived under illumination tends to increase. However, when the deviation of the color point of the lamp from the Planckian locus is excessively large on the lower right side, the light color becomes close to reddish purple, and therefore it is not preferable for general illumination.

Therefore, in the fluorescent lamp of the present invention, it is preferable that the color point of the lamp is located on the lower right side of the Planckian locus in the CIE 1960 UCS diagram, namely, that the sign of the chromaticity deviation from the Planckian locus is minus. Furthermore, it is preferable that the chromaticity deviation from the Planckian locus in the CIE 1960 UCS diagram is −0.007 to −0.003.

Figure 3:
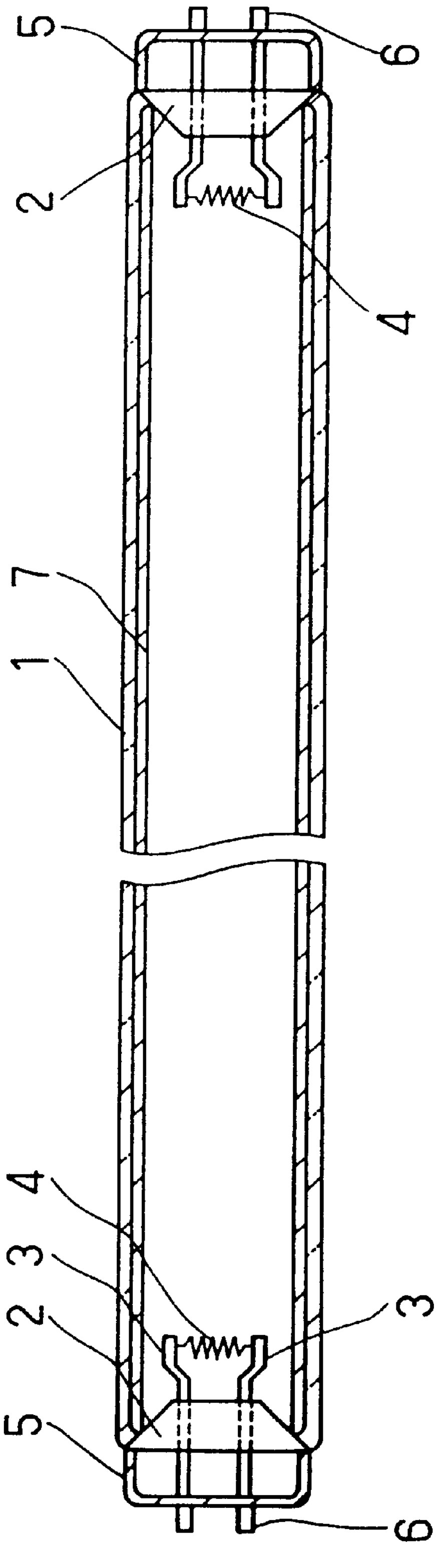
FIG. 3 is a cross sectional view showing an example of a structure of a fluorescent lamp of the present invention.

Next, the structure of the fluorescent lamp of the present invention will be described below. FIG. 3 is a cross sectional view showing an example of the fluorescent lamp of the present invention. A predetermined amount of inert gas (e.g., argon) and mercury are enclosed in a glass tube 1 whose inner surface is provided with a phosphor layer 7. The opposite ends of the glass tube 1 are sealed by stems 2, each of which is penetrated hermetically by two lead wires 3 connected to a filament electrode 4. The lead wires 3 are connected to electrode terminals 6 provided in a lamp base 5, which in turn is adhered to the end of the glass tube 1.

In the fluorescent lamp of the present invention, the phosphor layer 7 contains the above-described four phosphors.

It is sufficient that at least one blue phosphor that is activated with bivalent europium is used as the blue phosphor having an emission peak in the 440 to 470 nm wavelength range. Typical examples thereof include a bivalent europium activated barium magnesium aluminate phosphor ($BaMgAl_{10}O_{17}:Eu^{2+}$), a bivalent europium and bivalent manganese activated barium magnesium aluminate phosphor ($BaMgAl_{10}O_{17}:Eu^{2+},Mn^{2+}$), a bivalent europium activated strontium chlorophosphate phosphor ($Sr_{10}(PO_4)_6Cl_2:Eu^{2+}$), or the like.

It is sufficient that at least one green phosphor that is activated with bivalent manganese is used as the green phosphor having an emission peak in the 505 to 530 nm wavelength range. Typical examples thereof include a bivalent manganese activated cerium magnesium aluminate phosphor ($CeMgAl_{11}O_{19}:Mn^{2+}$), a bivalent manganese activated cerium magnesium zinc aluminate phosphor ($Ce(Mg,Zn)Al_{11}O_{19}:Mn^{2+}$), a bivalent manganese activated zinc silicate phosphor ($ZnSiO_4:Mn^{2+}$) or the like.

It is sufficient that at least one green phosphor that is activated with trivalent terbium is used as the green phosphor having an emission peak in the 540 to 570 nm wavelength range. Typical examples thereof include a trivalent cerium and trivalent terbium activated lanthanum orthophosphate phosphor ($LaPO_4:Ce^{3+},Tb^{3+}$), a trivalent terbium activated cerium magnesium aluminate phosphor ($CeMgAl_{11}O_{19}:Tb^{3+}$) or the like.

It is sufficient that at least one red phosphor that is activated with trivalent europium, bivalent manganese or tetravalent manganese is used as the red phosphor having an emission peak in the 600 to 670 nm wavelength range. Typical examples thereof include a trivalent europium activated yttrium oxide phosphor ($Y_2O_3:Eu^{3+}$), a trivalent europium activated yttrium oxysulfide phosphor ($Y_2O_2S:Eu^{3-}$), a bivalent manganese activated cerium gadolinium borate phosphor ($CeGdMgB_5O_{10}:Mn^{2+}$), a tetravalent manganese activated fluoromagnesium germanate phosphor ($3.5MgO.0.5MgF_2.GeO_2:Mn^{4+}$) or the like.

The blending ratio of the four phosphors can be determined suitably, depending on the types of the phosphors used, so that the characteristics of the fluorescent lamp as described above can be achieved. Generally, it is preferable that the content of the blue phosphor having an emission peak in the 440 to 470 nm wavelength range is 1 to 20 wt %, the content of the green phosphor having an emission peak in the 505 to 530 nm wavelength range is 3 to 40 wt %, the content of the green phosphor having an emission peak in the 540 to 570 nm wavelength range is 5 to 50 wt %, and the content of the red phosphor having an emission peak in the 600 to 670 nm wavelength range is 35 to 65 wt %. More preferably, the content of the blue phosphor having an emission peak in the 440 to 470 nm wavelength range is 1 to 20 wt %, the content of the green phosphor having an emission peak in the 505 to 530 nm wavelength range is 10 to 30 wt %, the content of the green phosphor having an emission peak in the 540 to 570 nm wavelength range is 10 to 40 wt %, and the content of the red phosphor having an emission peak in the 600 to 670 nm wavelength range is 35 to 65 wt %.

Next, a method for producing a fluorescent lamp of the present invention will be described by way of example of a method for producing a fluorescent lamp having the structure shown in FIG. 3.

First, a phosphor blend is prepared by blending the four phosphors in the predetermined ratio as described above. The phosphor blend is mixed with a suitable solvent to prepare a phosphor slurry. As the solvent, an organic solvent such as butyl acetate, water or the like can be used. The mixing ratio of the phosphor blend and the solvent is adjusted suitably so that the viscosity of the phosphor slurry is within the range that allows the phosphor slurry to be applied onto the inner surface of the glass tube. Furthermore, various additives, for example, a thickener such as ethyl cellulose or polyethylene oxide, a binder or the like, may be added to the phosphor slurry.

On the other hand, a glass tube 1 is prepared. The shape and the size of the glass tube 1 are not limited to a particular shape and size, and can be selected suitably depending on the intended type and use of the fluorescent lamp.

Next, the phosphor slurry is applied onto the inner surface of the glass tube 1 and dried to form a phosphor layer 7. This application step may be repeated several times. Then, argon gas and mercury are introduced into the glass tube 1 provided with a phosphor layer 7, and then the opposite ends of the glass tube 1 are sealed with stems 2. The stem 2 has been penetrated by two lead wires 3 connected to a filament element 4 beforehand. Furthermore, lamp bases 5 provided with electrode terminals 6 are adhered to the ends of the glass tube 1, and the electrode terminals 6 are connected to the lead wires 3. Thus, a fluorescent lamp can be obtained.

A luminaire of the present invention radiates illumination light that has emission peaks in the 440 to 470 nm wavelength range, the 505 to 530 nm wavelength range, the 540 to 570 nm wavelength range and the 600 to 670 nm wavelength range, and has a color temperature of 3700 K or less, preferably 3500 K or less, which is in a low color temperature region.

The luminaire of the present invention allows the color of an illuminated object to look colorful. In the luminaire of the present invention, the color gamut area Ga is not less than 102.5, and more preferably, 102.5 to 120.0.

In the luminaire of the present invention, the colorfulness of a color of an object perceived under illumination is correlated with the ratio $I_1/I_2$ of the emission peak energy $I_1$ in the wavelength range of 505 to 530 nm to the emission peak energy $I_2$ in the wavelength range of 540 to 570 nm and with the distance between the color point of the illumination light and the Planckian locus.

In the luminaire of the present invention, in order to improve the colorfulness of a color of an object perceived under illumination sufficiently, $I_1/I_2$ is set at 0.06 or more, preferably, 0.06 to 0.50, and more preferably, 0.1 to 0.35. Furthermore, in the luminaire of the present invention, it is preferable that the color point of the illumination light is on the lower right side of the Planckian locus in the CIE 1960 UCS diagram, namely, that the sign of the chromaticity deviation from the Planckian locus is minus. Furthermore, it is preferable that the chromaticity deviation from the Planckian locus in the CIE 1960 UCS diagram is −0.007 to −0.003.

Figure 4:
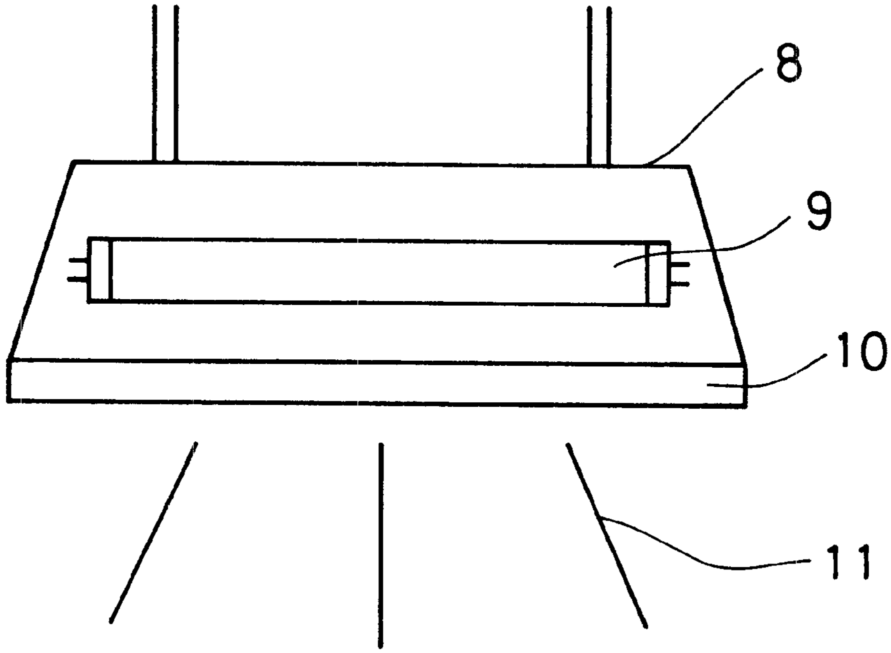
FIG. 4 is a drawing showing an example of a structure of a luminaire of the present invention.

Next, the structure of the luminaire of the present invention will be described below. FIG. 4 is a cross sectional view showing an embodiment of the luminaire of the present invention. The luminaire includes a luminaire housing 8, a light source 9 provided in the housing 8, and a transmitting plate 10 provided in a light release portion of the housing 8. In the luminaire, light radiated from the light source 9 passes through the transmitting plate 10, and the transmitted light is radiated to the outside as illumination light 11.

As the light source 9, any light sources can be used, as long as it radiates visible light comprising a light component belonging to the 440 to 470 nm wavelength range, a light component belonging to the 505 to 530 nm wavelength range, a light component belonging to the 540 to 570 nm wavelength range, and a light component belonging to the 600 to 670 nm wavelength range. For example, various discharge lamps such as a fluorescent lamp, an incandescent lamp or the like can be used as the light source 9.

The transmitting plate 10 generally is a transparent member based on glass or plastic, and the spectral transmittance thereof is controlled, depending on the emission spectrum of the light source 9 used, so that the illumination light 11 having the emission spectrum as described above is radiated.

The spectral transmittance of the transmitting plate 10 can be adjusted by mixing a substance that absorbs light in a specific wavelength range with glass or plastic that is to formed into the transmitting plate 10.

As the substance that absorbs light in a specific wavelength range, various metal ions, or inorganic or organic pigments can be used. Examples of the metal ions include $Cr^{3+}$ (≦470 nm, in the vicinity of 650 nm), $Mn^{3+}$ (in the vicinity of 500 nm), $Fe^{3+}$ (≦550 nm), $Co^{2+}$ (500 to 600 nm), $Ni^{2+}$ (400 to 560 nm), and $Cu^{2+}$ (400 to 500 nm), where main absorption wavelength ranges are in parenthesis.

Examples of the inorganic pigments include cobalt violet ($Co_3(PO_4)_2$;

480 to 600 nm), cobalt blue ($CoO.nAl_2O_3$; ≧520 nm), cobalt aluminum chromium blue ($CoO.Al_2O_3.Cr_2O_3$; ≧520 nm), ultramarine ($Na_{6-x}Al_{6-x}Si_{6+x}O_{24}.Na_yS_z$; ≧490 nm), cobalt green ($CoO.nZnO$; ≦450 nm, 600 to 670 nm), cobalt chromium green ($CoO.Al_2O_3.Cr_2O_3$; ≦450 nm, 600 to 670 nm), titanium yellow ($TiO_2.Sb_2O_3.NiO_2$; ≦520 nm), titanium barium nickel yellow ($TiO_2.Ba_2O.NiO_2$; ≦520 nm), Indian red ($Fe_2O_3$; ≦580 nm), and red lead ($Pb_3O_4$; ≦560 nm), where general composition formulae and main absorption wavelength ranges are in parenthesis.

Examples of the organic pigments include dioxazine compounds, phthalocyanine compounds, azo compounds, perylene compounds, pyrropyrrolic compounds or the like.

A suitable substance or substances are selected from among these substances depending on the emission spectrum of the light source 9, and used alone or in combination, so that a desired spectral transmittance can be achieved.

In the case where the transmitting plate 10 is formed of glass, generally a metal ion is used. In this case, glass can be doped with a metal ion as a component of the glass composition, and then the glass can be molded into a desired shape to form the transmitting plate. It is preferable that the metal ion is added in an amount of not more than 15 mol % of the entire glass.

In the case where the transmitting plate 10 is formed of plastic, generally an inorganic or organic pigment is used. In this case, a pigment can be mixed with a plastic material before molding, and then the mixture can be molded into a desired shape to form the transmitting plate. It is preferable that the pigment is added in an amount of not more than 5 wt % of the entire plastic.

Furthermore, the spectral transmittance of the transmitting plate 10 can be adjusted by forming a layer such as a plastic film containing the light absorbing substance as described above on the surface of glass or plastic to be formed into the transmitting plate 10. Alternatively, the spectral transmittance of the transmitting plate 10 can be adjusted by applying a paint containing the light absorbing substance as described above on the surface of glass or plastic to be formed into the transmitting plate 10.

Furthermore, in the luminaire of the present invention, the above-described fluorescent lamp according to the present invention can be used as the light source 9. In this case, it is possible to use a transmitting plate whose spectral transmittance is substantially uniform in the visible range as the transmitting plate 10. In other words, it is possible to use a transmitting plate that substantially does not contain the light absorbing substance.

Furthermore, the luminaire of the present invention may include a reflecting plate that reflects light radiated from the light source. In this embodiment, light reflected from the reflecting plate is radiated to the outside as illumination light. Alternatively, the luminaire may include both of the transmitting plate and the reflecting plate.

The spectral reflectance of the reflecting plate is controlled depending on the emission spectrum of the light source used, so that the illumination light having the emission spectrum as described above is radiated. The spectral reflectance of the reflecting plate can be adjusted by mixing the light absorbing substance with a substrate to formed into the reflecting plate, or by forming a translucent layer containing the light absorbing substance on a substrate to formed into the reflecting plate.

EXAMPLES

Example 1

A plurality of types of fluorescent lamps having different energy ratios $I_1/I_2$ of the emission peak energy in the 505 to 530 nm wavelength range to the emission peak energy in the 540 to 570 nm wavelength range were produced by using a bivalent europium activated barium magnesium aluminate blue phosphor ($BaMgAl_{10}O_{17}:Eu^{2+}$) (emission peak wavelength 450 nm), a bivalent manganese activated cerium magnesium aluminate green phosphor ($CeMgAl_{11}O_{19}:Mn^{2+}$) (emission peak wavelength 518 nm), a trivalent cerium and trivalent terbium activated lanthanum orthophosphate green phosphor ($LaPO_4:Ce^{3+},Tb^{3+}$) (emission peak wavelength 545 nm), and a trivalent europium activated yttrium oxide red phosphor ($Y_2O_3:Eu^{3+}$) (emission peak wavelength 611 nm) while changing the blending ratio of these phosphors. All of the fluorescent lamps were adjusted to have a correlated color temperature of 3200 K and a chromaticity deviation from the Planckian locus in the CIE 1960 UCS diagram of 0.

Each of the fluorescent lamp was evaluated visually regarding the colorfulness of various colors in a space perceived under illumination, and the increment of the color gamut area ΔGa was calculated. ΔGa is an increment with respect to the color gamut area (=103.9) that is calculated with respect to a comparative sample. Herein, the comparative sample is a fluorescent lamp produced by using 6 wt % of a bivalent europium activated barium magnesium aluminate blue phosphor, 43 wt % of a trivalent cerium and trivalent terbium activated lanthanum orthophosphate green phosphor, and 51 wt % of a trivalent europium activated yttrium oxide red phosphor. The comparative sample was adjusted to have a correlated color temperature of 3200 K and a chromaticity deviation from the Planckian locus in the CIE 1960 UCS diagram of 0.

The results were as follows. In the range of $\Delta Ga < 2.5$, the colorfulness of colors perceived under illumination was not substantially different from that of the comparative sample, whereas in the range of $\Delta Ga \geqq 2.5$, the colorfulness of colors perceived under illumination improved sufficiently. However, in the range of $\Delta Ga > 12.5$, some illuminated colors looked so colorful as to look unnatural.

Figure 5:
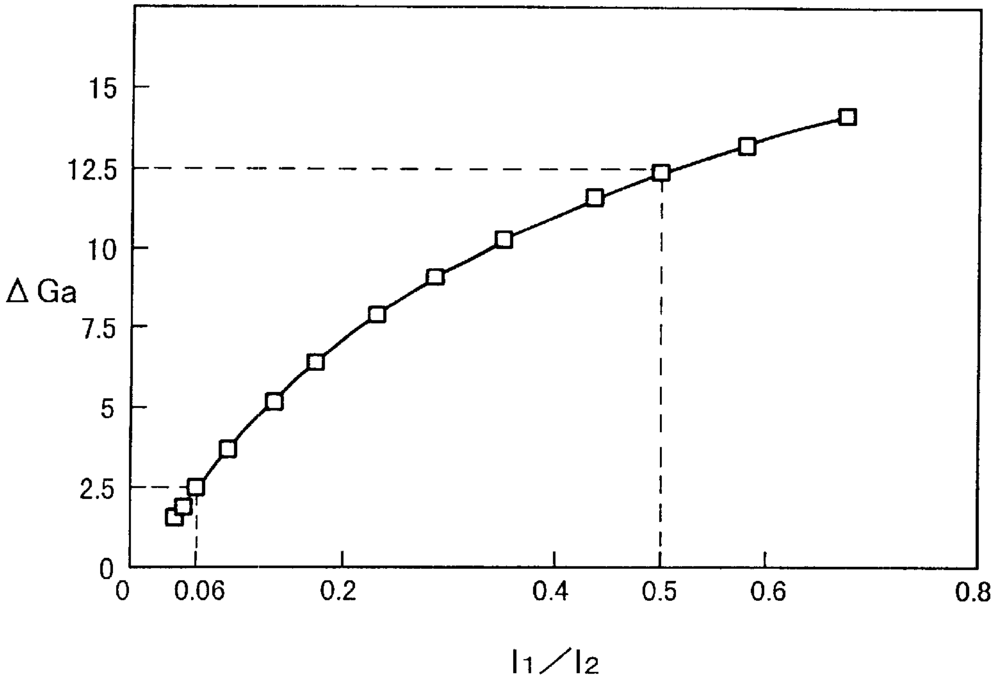
FIG. 5 is a graph showing the relationship between the ratio $I_1/I_2$ of the emission peak energy $I_1$ in the wavelength range of 505 to 530 nm to the emission peak energy $I_2$ in the wavelength range of 540 to 570 nm and the increment of the color gamut area ΔGa with respect to a fluorescent lamp having a correlated color temperature of 3200 K produced as an example of the present invention.

FIG. 5 is a graph showing the relationship between ΔGa and $I_1/I_2$. The results shown in FIG. 5 confirms that Ga increases with increasing $I_1/I_2$. As shown in FIG. 5, the range of $I_1/I_2 \geqq 0.06$ corresponds to the range of $\Delta Ga \geqq 2.5$, and the colorfulness of colors perceived under illumination improves sufficiently in this range. However, in the range of $I_1/I_2 > 0.50$ corresponding to the range of $\Delta Ga > 12.5$, some illuminated colors look so colorful as to look unnatural.

Example 2

A fluorescent lamp having a phosphor layer containing 4 wt % of a bivalent europium activated barium magnesium aluminate blue phosphor ($BaMgAl_{10}O_{17}:Eu^{2+}$), 18 wt % of a bivalent manganese activated cerium magnesium aluminate green phosphor ($CeMgAl_{11}O_{19}:Mn^{2+}$), 22 wt % of a trivalent cerium and trivalent terbium activated lanthanum orthophosphate green phosphor ($LaPO_4:Ce^{3+},Tb^{3+}$), and 56 wt % of a trivalent europium activated yttrium oxide red phosphor ($Y_2O_3:Eu^{3+}$) was produced (hereinafter, referred to as "sample No. 1"). The correlated color temperature of sample No. 1 was 3000 K and the chromaticity deviation from the Planckian locus in the CIE 1960 UCS diagram was 0.

Figure 6:
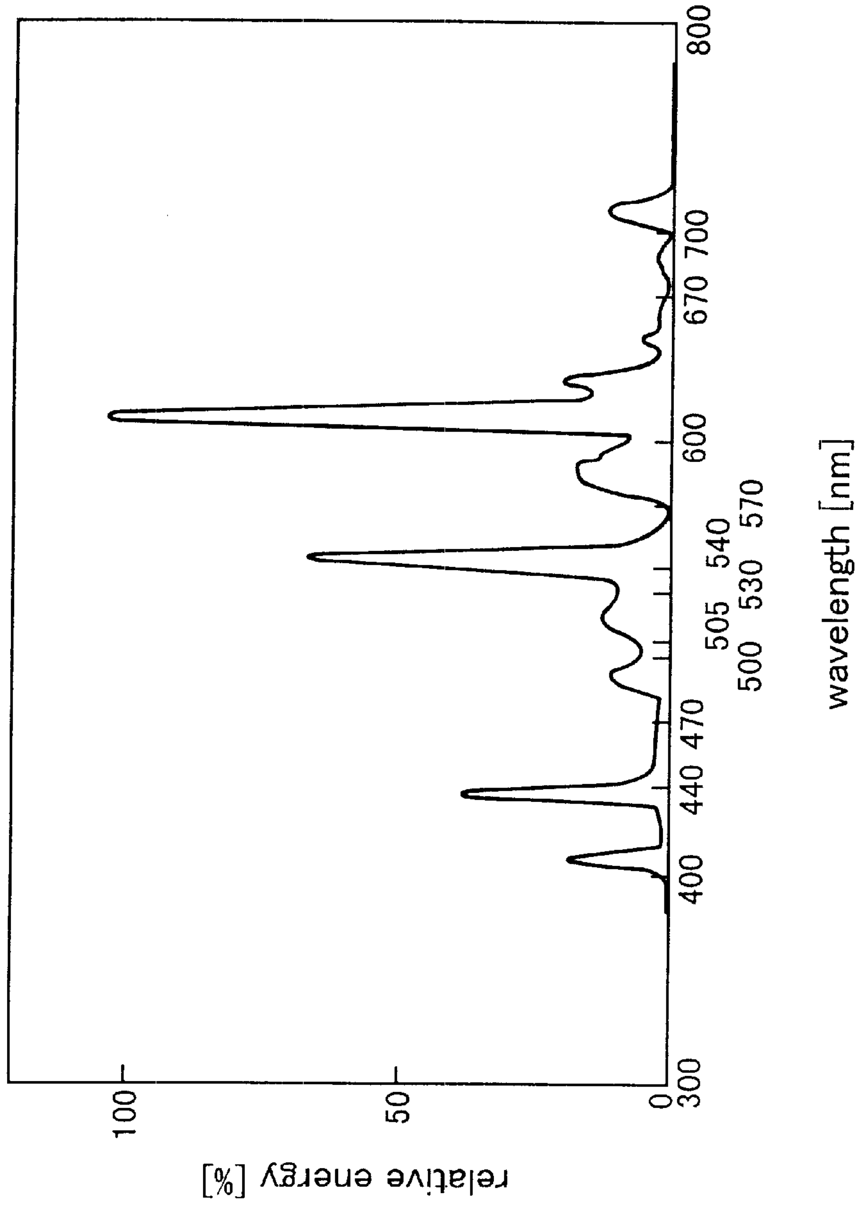
FIG. 6 is an emission spectrum of a fluorescent lamp produced as an example of the present invention.

When the emission spectrum of sample No. 1 was measured, the energy ratio $I_1/I_2$ of the emission peak energy in the 505 to 530 nm wavelength range to the emission peak energy in the 540 to 570 nm wavelength range was 0.19 . FIG. 6 shows the results of the emission spectrum.

As a comparative sample, a fluorescent lamp provided with a phosphor layer containing 4 wt % of a bivalent europium activated barium magnesium aluminate blue phosphor, 42 wt % of a trivalent cerium and trivalent terbium activated lanthanum orthophosphate green phosphor, and 54 wt % of a trivalent europium activated yttrium oxide red phosphor was produced (hereinafter, referred to as "sample No. 2"). The correlated color temperature of sample No. 2 was 3000 K and the chromaticity deviation from the Planckian locus in the CIE 1960 UCS diagram was 0. When the emission spectrum of sample No. 2 was measured, the emission peak was substantially not present in the 505 to 530 nm wavelength range.

A space where various colors are present was illuminated with samples Nos. 1 and 2, and how the illuminated colors in the space looked was evaluated visually. Although the lamp colors of samples Nos. 1 and 2 were substantially the same, it was evident that sample No. 1 allowed the illuminated colors to look more colorful and agreeable than sample No. 2. Furthermore, when the color gamut area Ga was calculated, Ga of sample No. 1 was 111.0, which is much larger than Ga of sample No. 2 of 104.3.

Example 3

A fluorescent lamp having a phosphor layer containing 9 wt % of a bivalent europium activated barium magnesium aluminate blue phosphor ($BaMgAl_{10}O_{17}:Eu^{2+}$) (emission peak wavelength 450 nm), 17 wt % of a bivalent manganese activated cerium magnesium zinc aluminate green phosphor ($Ce(Mg,Zn)Al_{11}O_{19}:Mn^{2+}$) (emission peak wavelength 518 nm), 25 wt % of a trivalent cerium and trivalent terbium activated lanthanum orthophosphate green phosphor ($LaPO_4:Ce^{3+},Tb^{3+}$) (emission peak wavelength 545 nm), and 49 wt % of a trivalent europium activated yttrium oxide red phosphor ($Y_2O_3:Eu^{3+}$) (emission peak wavelength 611 nm) was produced (hereinafter, referred to as "sample No. 3"). The correlated color temperature of sample No. 3 was 3605 K and the chromaticity deviation from the Planckian locus in the CIE 1960 UCS diagram was −0.0032. When the emission spectrum of sample No. 3 was measured, the energy ratio $I_1/I_2$ of the emission peak energy in the 505 to 530 nm wavelength range to the emission peak energy in the 540 to 570 nm wavelength range was 0.18.

As a comparative sample, a fluorescent lamp provided with a phosphor layer containing 11 wt % of a bivalent europium activated barium magnesium aluminate blue phosphor, 44 wt % of a trivalent cerium and trivalent terbium activated lanthanum orthophosphate green phosphor, and 45 wt % of a trivalent europium activated yttrium oxide red phosphor was produced (hereinafter, referred to as "sample No. 4"). The correlated color temperature of sample No. 4 was 3600 K and the chromaticity deviation from the Planckian locus in the CIE 1960 UCS diagram was −0.0031. When the emission spectrum of sample No. 4 was measured, the emission peak was substantially not present in the 505 to 530 nm wavelength range.

A space where various colors are present was illuminated with samples Nos. 3 and 4, and how the illuminated colors in the space looked was evaluated visually. Although the lamp colors of samples Nos. 3 and 4 were substantially the same, it was evident that sample No. 3 allowed the illuminated colors to look more colorful and agreeable than sample No. 4. Furthermore, when the color gamut area Ga was calculated, Ga of sample No. 3 was 111.4, which is much larger than Ga of sample No. 4 of 104.2.

Example 4

A fluorescent lamp having a phosphor layer containing 8 wt % of a bivalent europium activated strontium chlorophosphate blue phosphor ($Sr_{10}(PO_4)_6Cl_2{:}Eu^{2+}$) (emission peak wavelength 450 nm), 14 wt % of a bivalent manganese activated zinc silicate green phosphor ($ZnSiO_4{:}Mn^{2+}$) (emission peak wavelength 525 nm), 29 wt % of a trivalent terbium activated cerium magnesium aluminate green phosphor ($CeMgAl_{11}O_{19}{:}Tb^{3+}$) (emission peak wavelength 545 nm), and 49 wt % of a trivalent europium activated yttrium oxide red phosphor ($Y_2O_3{:}Eu^{3+}$) (emission peak wavelength 611 nm) was produced (hereinafter, referred to as "sample No. 5"). The correlated color temperature of sample No. 5 was 3115 K and the chromaticity deviation from the Planckian locus in the CIE 1960 UCS diagram was −0.0048. When the emission spectrum of sample No. 5 was measured, the energy ratio $I_1/I_2$ of the emission peak energy in the 505 to 530 nm wavelength range to the emission peak energy in the 540 to 570 nm wavelength range was 0.13.

As a comparative sample, a fluorescent lamp provided with a phosphor layer containing 8 wt % of a bivalent europium activated strontium chlorophosphate blue phosphor, 42 wt % of a trivalent terbium activated cerium magnesium aluminate green phosphor, and 50wt % of a trivalent europium activated yttrium oxide red phosphor was produced (hereinafter, referred to as "sample No. 6"). The correlated color temperature of sample No. 6 was 3123 K and the chromaticity deviation from the Planckian locus in the CIE 1960 UCS diagram was −0.0045. When the emission spectrum of sample No. 6 was measured, the emission peak was substantially not present in the 505 to 630 nm wavelength range.

A space where various colors are present was illuminated with samples Nos. 5 and 6, and how the illuminated colors in the space looked was evaluated visually. Although the light colors of samples Nos. 5 and 6 were substantially the same, it was evident that sample No. 5 allowed the illuminated colors to look more colorful and agreeable than sample No. 6. Furthermore, when the color gamut area Ga was calculated, Ga of sample No. 5 was 112.0, which is much larger than Ga of sample No. 6 of 106.3.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A fluorescent lamp comprising a phosphor layer containing a blue phosphor having an emission peak in a 440 to 470 nm wavelength range, a green phosphor having an emission peak in a 505 to 530 nm wavelength range, a green phosphor having an emission peak in a 540 to 570 nm wavelength range, and a red phosphor having an emission peak in a 600 to about 611 nm wavelength range, wherein a ratio $I_1/I_2$ of an emission peak energy $I_1$, in a wavelength range of 505 to 530 nm to an emission peak energy $I_2$ in a wavelength range of 540 to 570 nm is not less than 0.06, a correlated color temperature of the lamp is not more than 3700 K, and the phosphor layer does not contain a red phosphor having an emission peak wavelength that is greater than about 611 nm.

2. The fluorescent lamp according to claim 1, wherein the ratio $I_1/I_2$ of the emission peak energy $I_1$ in a wavelength range of 505 to 530 nm to the emission peak energy $I_2$ in a wavelength range of 540 to 570 nm is in a range from 0.06 to 0.50.

3. The fluorescent lamp according to claim 1, wherein a color point of the lamp is present in a region where a sign of a chromaticity deviation from a Planckian locus is minus in a CIE 1960 UCS diagram.

4. The fluorescent lamp according to claim 1, wherein a color point of the lamp is present in a region where a chromaticity deviation from a Planckian locus is in a range from −0.007 to −0.003 in a CIE 1960 UCS diagram.

5. The fluorescent lamp according to claim 1, wherein the blue phosphor having an emission peak in the 440 to 470 nm wavelength range is a blue phosphor that is activated with bivalent europium.

6. The fluorescent lamp according to claim 1, wherein the green phosphor having an emission peak in the 505 to 530 nm wavelength range is a green phosphor that is activated with bivalent manganese.

7. The fluorescent lamp according to claim 1, wherein the green phosphor having an emission peak in the 540 to 570 nm wavelength range is a green phosphor that is activated with trivalent terbium.

8. The fluorescent lamp according to claim 1, wherein the red phosphor having an emission peak in the 600 to about 611 nm wavelength range is a red phosphor that is activated with at least one selected from the group consisting of trivalent europium, bivalent manganese and tetravalent manganese.

9. A luminaire radiating illumination light comprising a combination of emission lights whose main emission peaks are in 440 to 470 nm, 505 to 530 nm, 540 to 570 nm, and 600 to about 611 nm wavelength ranges and are not at a wavelength of greater than about 611 nm, wherein a ratio $I_1/I_2$ of an emission peak energy $I_1$, in a wavelength range of 505 to 530 nm to an emission peak energy $I_2$ in a wavelength range of 540 to 570 nm is not less than 0.06, and a correlated color temperature of the illumination light is not more than 3700 K.

10. The luminaire according to claim 9 comprising a light source and at least one selected from the group consisting of a transmitting plate and a reflecting plate for converting light radiated from the light source to the illumination light.

11. The luminaire according to claim 9, wherein the ratio $I_1/I_2$ of the emission peak energy $I_1$ in the wavelength range of 505 to 530 nm to the emission peak energy $I_2$ in the wavelength range of 540 to 570 nm is in a range from 0.06 to 0.50.

12. The luminaire according to claim 9, wherein a color point of the illumination light is present in a region where a sign of a chromaticity deviation from a Planckian locus is minus in a CIE 1960 UCS diagram.

13. The luminaire according to claim 9, wherein a color point of the illumination light is present in a region where a chromaticity deviation from a Planckian locus is in a range from −0.007 to −0.003 in a CIE 1960 UCS diagram.

* * * * *